United States Patent [19]

Lemelson et al.

[11] Patent Number: 5,019,815
[45] Date of Patent: May 28, 1991

[54] RADIO FREQUENCY CONTROLLED INTERROGATOR-RESPONDER SYSTEM WITH PASSIVE CODE GENERATOR

[76] Inventors: Jerome H. Lemelson, 85 Rector St., Metuchen, N.J. 08840; Christian Grund, 707L Eagle Heights, Madison, Wis. 53705

[21] Appl. No.: 21,217

[22] Filed: Mar. 3, 1987

Related U.S. Application Data

[63] Continuation of Ser. No. 699,573, Feb. 4, 1985, abandoned, which is a continuation-in-part of Ser. No. 298,743, Sep. 2, 1981, Pat. No. 4,532,511, which is a continuation-in-part of Ser. No. 84,429, Oct. 12, 1979, Pat. No. 4,288,689.

[51] Int. Cl.$^5$ .............................................. G08G 1/01
[52] U.S. Cl. .................................. 340/933; 246/122 R; 340/572; 340/825.54; 340/993
[58] Field of Search ............... 340/901, 905, 933, 988, 340/989, 991, 993, 572, 825.36, 825.49, 825.54; 180/167; 246/29 R, 122 R; 342/44, 51; 455/605, 54, 92, 99

[56] References Cited

U.S. PATENT DOCUMENTS

| | | | |
|---|---|---|---|
| 3,377,616 | 4/1968 | Auer, Jr. | 340/989 |
| 3,878,528 | 4/1975 | Majeau | 342/44 |
| 3,888,437 | 6/1975 | Birkin | 246/122 R |
| 4,040,053 | 8/1977 | Olsson | 246/122 R |
| 4,068,232 | 1/1978 | Meyers et al. | 342/44 |
| 4,104,630 | 8/1978 | Chasek | 342/44 |
| 4,114,151 | 9/1978 | Denne et al. | 455/605 |
| 4,288,689 | 9/1981 | Lemelson et al. | 342/44 |
| 4,532,511 | 7/1985 | Lemelson | 340/933 |
| 4,550,444 | 10/1985 | Uebel | 246/167 R |

Primary Examiner—Joseph A. Orsino
Assistant Examiner—Brent A. Swarthout
Attorney, Agent, or Firm—Cobrin, Feingertz & Gittes

[57] ABSTRACT

An electronic system for automatically identifying objects employing microminiature electronic circuitry supported by each object and containing three operable subsystems, (a) a means for converting shortwave energy from a local energy field to electrical energy, (b) a means for generating coded electrical signals and (c) a means for shortwave transmitting such signals as codes to a local receiver. The system also includes a shortwave receiving means and an electronic computer operable to process and analyze the coded signals received by the receiver from the electronic circuitry energized when in the energy field. The computer generates control signals which are recorded and are utilized in tracking the objects.

4 Claims, 2 Drawing Sheets

RADIO FREQUENCY CONTROLLED INTERROGATOR-RESPONDER SYSTEM WITH PASSIVE CODE GENERATOR

CROSS REFERENCE TO RELATED APPLICATIONS

This is continuation of application Ser. No. 699,573, now abandoned and filed 2-4-85, a continuation-in-part of application Ser. No. 298,743 filed Sept. 2, 1981, now U.S. Pat. No. 4,532,511, having as a parent application Ser. No. 084,429 filed Oct. 12, 1979 now U.S. Pat. No. 4,288,689.

BACKGROUND OF THE INVENTION

1. Field of the Invention

This invention concerns a method and apparatus for identifying objects by securing different code generating electrical circuits, such as microelectronic circuits provided on a small chip substrates, on different objects and activating each circuit by means of external energy applied thereto, when it is within range or contact with a source of such energy. The resulting code generated when the microelectronic circuit become activated or energized, is either transmitted by short wave or as electrical signals on a temporarily completed circuit to a computer where it is recorded and either analyzed or applied to effect a control function such as the operation of a mechanical gate, switch or conveyance for the object containing the code generating circuit.

2. Description of the Prior Art

The prior art employed electro-optically scannable printed codes, reflectors, pins for operating limit switches and other scannable recordings, all of which suffered shortcomings due to wear, weathering, switch failure, scanning and reading difficulties, etc. Electro-optical reading systems require suitable alignment and operation of the photoelectric detector or detectors effecting such reading with respect to the printed or reflective codes disposed on the objects passing the reading station. Such systems also require unobstructed pathways between the reader and the codes disposed on the objects. Weather conditions also affect the ability to electro-optically read codes. Limit switches are subject to malfunction and wear. Magnetic record reading systems generally require alignment and proper contact between magnetic transducer and the recording surface.

SUMMARY OF THE INVENTION

This invention relates to a system and method for identifying objects, such as vehicles, pallets for work, work holding devices, containers and the like wherein such objects are subject to movement through a system or pathway or a plurality of same and are subject to reuse and recycling or reuse or continuous operation. In particular, the system and method are based on the use of a plurality of microelectronic circuits, preferably mounted on small substrates, such as silicon chips, each of which circuits is constructed to provide a different electrical code on an output thereof when energized by means of an energy field or direct current applied thereto when the circuit or its input is coupled to a source of such current. The microelectronic circuits employed are capable of generating rather complex codes due to their high density of switching elements and, accordingly may be employed to generate substantial information realting to routing directions for the objects, identification and address information, contents of containers, dates of manufacture, shipment, storage and inventory information, machine operation, etc.

Accordingly it is a primary object of this invention to provide an improved system and method for identifying objects, such as vehicles, freight cars, work-in-process, work holding pallets, tool holders, tote boxes and other containers or material and work and the like.

Another object is to provide a system and method for identifying objects and container or pallets for holding objects and work-in-process or storage wherein the identifying means is capable of generating a code or plurality of codes which may be employed for controlling movement, routing and inventory.

Another object is to provide a system and method for automatically identifying objects by means of microelectronic code generating circuits which are low in cost, capable of being easily fabricated and programmed or coded, will operate under a range of ambient conditions, are relatively foolproof in operation and have substantial life expectancy.

Another object is to provide an apparatus and method for electronically identifying railway freight cars and other similar railways cars.

Another object is to provide a system, including a plurality of microminiature electrical circuits or circuit devices of a passive nature, and electronic means for detecting code signals generated by the circuit or the presence of the coded antenna supported on the side of the vehicle so as to identify the vehicle.

Another object is to provide a vehicle identification system employing microminiature electronics for generating and short wave transmitting code signals wherein the electrical energy for generating and transmitting such codes is derived from an external source of radiant energy.

Another object is to provide a vehicle identification system employing microminiature electronics code generating circuits for each car or vehicle to be identified which code generating means is tamperproof and not subject to weather deterioration and malfunction.

With the above and such other objects in view as many hereinafter more fully appear, the invention consists of the novel constructions, combinations of parts and the method employed for identifying vehicles and the like, as will be more fully described and illustrated in the accompanying drawings, but it is to be understood that changes, variations and modifications may be resorted to which fall within the scope of the invention as claimed.

Figure 1:
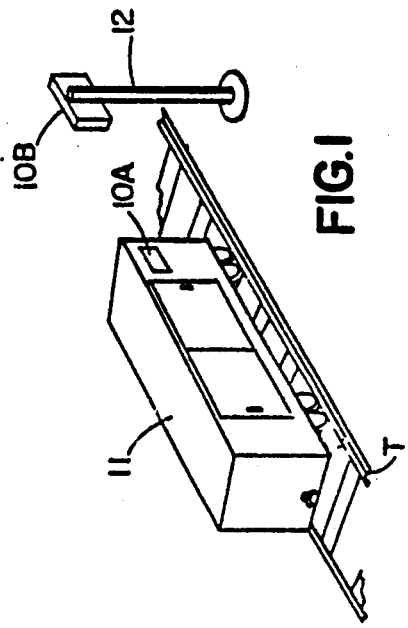
FIG. 1 is an isometric view of a freight car and components of an electronic identification system therefore.

In FIG. 1 is shown a vehicle, such as a freight car 11 traveling along the rails of a track T, preferably in tandem array with a plurality of other freight cars [not shown] of similar or different configurations such as a train of such cars being hauled or pushed by one or more locomotives between destination points of the rail system of which the track T is a part of.

A communication system is provided between the freight car 11, and other freight cars employed in the system, and a number of detection and communication devices employed in the system, one of which is illustrated as being supported by a pole 12 or other suitable structure immediately adjacent the track T. Such communication system includes code generating or indicating subsystems, denoted 10A in FIG. 1, supported at the side of each freight car and preferably at about the level of each electronic subsystem 10B supported by each pole or structure 12. The latter subsystem 10B is operable to sense a code or electrical circuit means defining the subsystem 10A supported by the vehicle or car 11, preferably as the car 11 passes the detection station and the electronic sensing device 10B thereof so that only the coded subsystem or code signals of each car is sensed and detected when it is in the immediate vicinity of the sensing means as it passes such sensing means.

Figure 2:
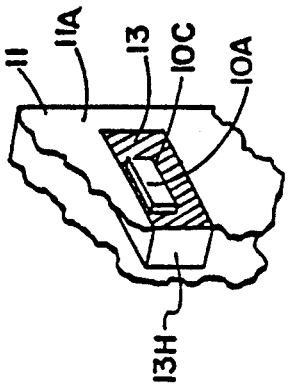
FIG. 2 is an isometric view of a fragment of a wall of a freight car and an electronic package embedded therein.

The electronic subsystem 10A is shown in FIG. 2 as supported within a housing 13H which housing is supported within or against the side wall 11A of the freight car 11. The container for the electronic subsystem 10A is preferably encapsulated or packed within a shock absorbing material 13 which fills the housing 13H and preferably seals the container 10C for the subsystem within the container 13H, to render it both weather and shock proof as well as tamper proof. If supported within the wall 11A of the freight car, the electrical code generating subsystem 10A can be completely sealed therein and hidden from view so as to provide it tamper-proof except when access for maintenance and inspection from the interior of the freight car. The container 10C and its contents may also be permanently sealed in place within the wall 11A or may contain an access cover [not shown] which is openable from either the inside or the outside of the freight car.

Figure 3:
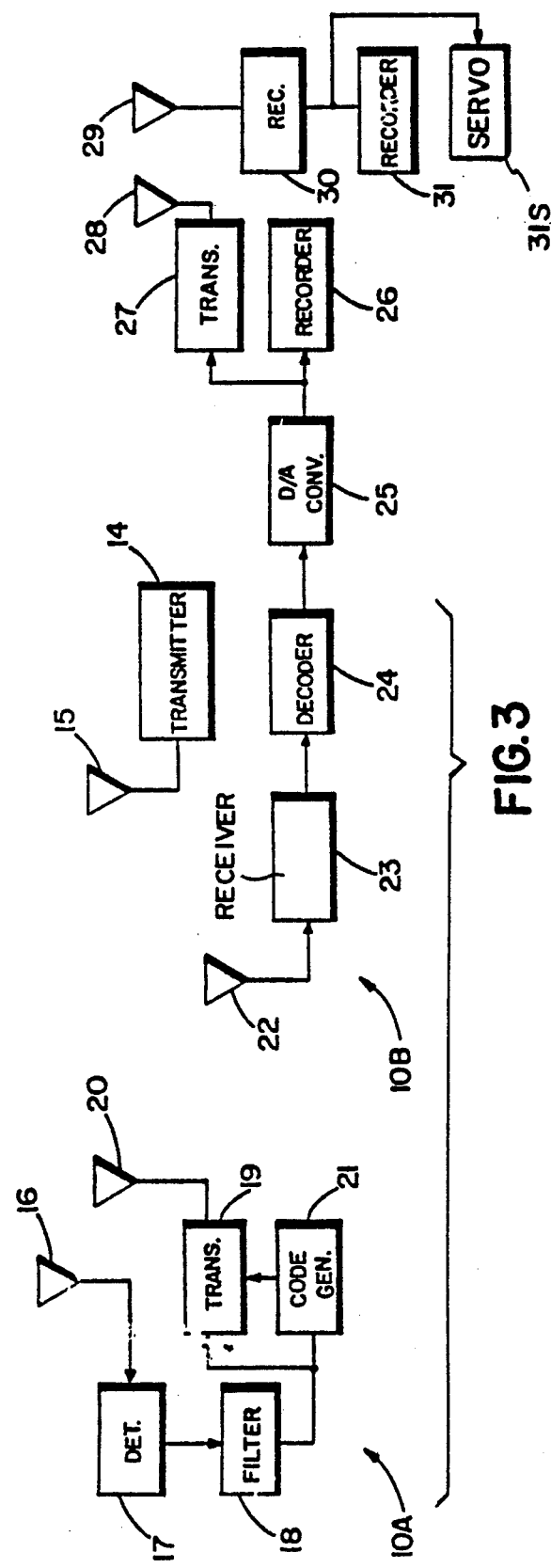
FIG. 3 is a schematic diagram of one form of communication system embodying the instant invention.

In FIG. 3 is shown details of one form of the communication system which includes a short wave transmitter 14, such as a power oscillator, which produces an ultrahigh frequency short wave signal or other type of short wave signal, which is radiated by an antenna 15 and preferably located along or protruding from the housing containing subsystem 10B or the pole mount 12 therefor. Power for the transmitter 14 may be controllably gated on by a sensor or limit switch which detects movement of the freight car 11 past the mount 12. Short wave energy radiated from antenna 15 is received by an antenna 16 forming part of subsystem 10A, when it passes within a certain distance of the radiating subsystem 10B. Such received radiation is converted to an electrical current in electronic circuits which are connected to the antenna 16 and is rectified by a detector 17 and filtered to a steady direct current by a filter 18 and applied thereafter as operational power for energizing and powering a short wave transmitter 19 and a microminiature electronic circuit code generator 21, the output of which is connected to the transmitter 19. When so activated by received energy transmitted by transmittor 14, the code generator 21 generates an electrical code or code signal which it applies to transmittor 19 which short wave broadcasts such code on a broadcast antenna 20 connected to the output of the transmittor 19. As indicated above, the entire system 10A, perhaps with the exception of the antennas 16 and 20, may be completely self contained within a single housing and formed on a single printed circuit or integrated circuit chip disposed in the housing 10C and encapsulated within the material 13.

Short wave code signals which are radiated by antenna 20 are intercepted by a short wave receiving antenna 22 forming part of the subsystem 10B and are converted to electrical signals which are detected by a short wave receiver 23 to which the antenna 22 is connected. Such signals are decoded by a decoder 24, the output of which extends to a digital-to-analog converter 25, the output of which converter is connected to a recorder 26 and/or a short wave transmitter 27 which transmits the code bearing signal, via an antenna 28, to a remote receiving and recording location, such as a central or satellite computer for recording and controlling freight car movement. Such an arrangement is illustrated to the right of FIG. 3 and includes a short wave receiving antenna 29, which is connected to a short wave receiver 30, the output of which extends to a recorder 31, which may be a magnetic recorder or a recording portion of a digital computer employed at such remote location to keep track of all freight cars passing locations such as that illustrated in FIG. 1.

It is also noted that transmitter 27 or an auxiliary circuit connected thereto and operable to be activated each time the convertor 25 or decoder 24 generates an output, may be operable to generate a code specific to the location of the subsystem 10B for identifying such location, either in advance of or after the received short wave signal is transmitted to the remote location at which the receiver 30 is located.

Figure 4:
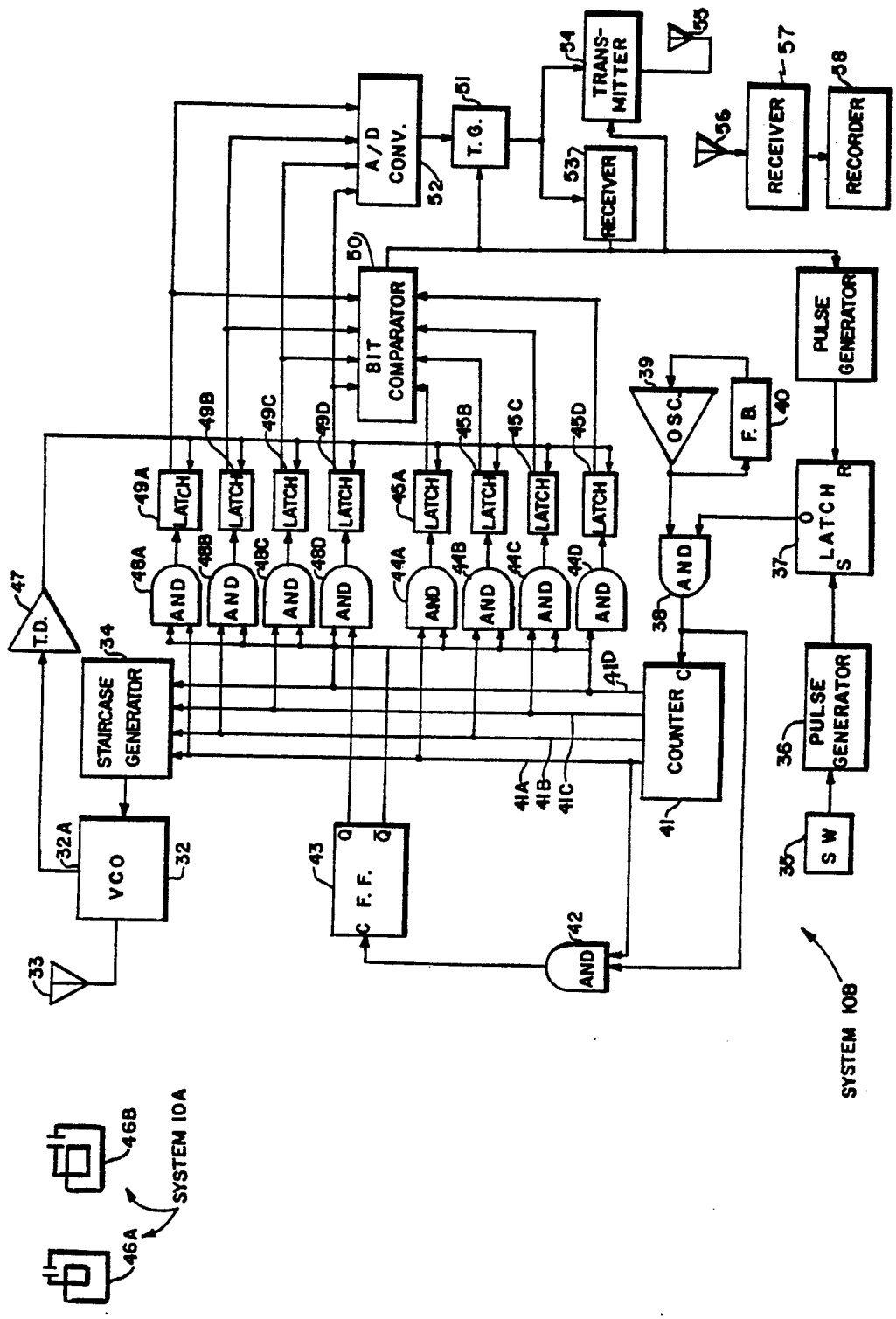
FIG. 4 is a schematic diagram of a modification form of the communication system shown in FIG. 3.

A modified form of the subsystem 10B is illustrated in FIG. 4 which employs electronic circuit means for detecting variations in radiation generated by an oscillator, when a tuned electrical circuit of the same frequency is brought within a given range of such oscillator, due to absorption of some of the radiated energy by such tuned circuit in a manner to create a load on the oscillator which may cause a given change in an electrical parameter of the oscillator, such as source current if the oscillator is composed of a field effect transistor. If such a field effect transistor is employed to form an oscillator, and the oscillator is a so-called VCO oscillator or voltage controlled oscillator, denoted 32 in FIG. 4, it may be designed to produce a number of discrete, stable frequencies each of which is representative of a particular digit or number in a code and is determined by the voltage steps as a staircase generator 34.

When a particular freight car or other vehicle supporting a subsystem 10A causes a normally open detection switch 35, such as a limit switch, photoelectric detector, magnetic or ultrasonic switch to be closed a pulse generator 36 is caused by the closure of such switch to generate a pulse signal which sets a latch 37, the output of which comprises one input to an AND circuit 38. The other input to AND circuit 38 extends from a clock oscillator 39 having a feedback loop circuit 40. Whenever the output of latch 37 is activated, pulses from oscillator 39 are transferred via AND gate 38 to a decade counter 41, which sequentially activates its plural outputs denoted 41A, 41B, 41C and 41D, in response to the pulses generated by the clock oscillator 39. When coincidence occurs between a clock pulse from oscillator 39 and a true level signal is received from the output of counter 41, an AND gate 42 is activated which controls the clock input of a flip-flop 43, such as a JK flip-flop, causing the $\overline{Q}$ output of such flip-flop to become activated providing a signal input to each of a plurality of AND gates, denoted 44A–44D, allowing such gates to transfer the state of their respective inputs from counter 41 to enable such output signals to set respective of a plurality of latches, denoted 45A–45D.

While the latches 45A–45D are being set, the outputs of counter 41 are sequentially activated and the signals so generated on such outputs are input to the staircase generator 34 and are employed to determine the voltage steps in the output of such staircase generator to determine the particular discrete of the voltage controlled oscillator 32. When an approximately tuned circuit of subsystem 10B, such as a parallel inductor/capacitor circuit 46A and 46B, is within range of the signals radiated by antenna 33, it absorbs some of the radiated energy when the proper frequency thereof is generated, as determined by the precise voltage output of the staircase generator 34. When such tuned circuit is sensed, the parameter of the voltage controlled oscillator 32 changes and is reflected at output 32A and, if such output is of sufficient magnitude, it may be employed to trigger a thresh-hold detector 47, the output of which provides data input to the latches 45A–45D and 49A–49D.

When counter 41 counts through a full cycle and then generates a true output signal on an output 41A thereof, the AND gate 42 is activated, as previously indicated, and transfers a second clock pulse from oscillator 39 to flip-flop 43 toggling such flip-flop switch and thereby deactivating its $\bar{Q}$ output so as to disable the AND gates 44A–44D and to activate the Q output of such flip-flop, which output forms one true input to each of the AND gates 44A–44D inclusive. This action allows the AND gates 44A–44D to transfer the state of their other respective inputs from the output 41A–41D of counter 41, to their respective latches 45A–45D.

The outputs of latches 45A–45D form one set of inputs to a bit comparator 50. The other set of inputs to bit comparator 50 extends from the outputs of latches 49A–49D inclusively. When parity is achieved in the two sets of inputs of the comparator 50, it indicates that precisely the same data has been read in two consecutive cycles of the counter 41 with the possible exception of all zero's. Comparator 50 gives a true output which activates a transmission gate 51, allowing it to transfer the output of digital-to-analog converter 52 to a receiving means 53 which may include a microprocessor recording circuit, tape recorder or other means. The data from the digital-to-analog converter 52 is obtained from information held in latches 48A–48D and is representative of the information which has been read. When the output of a bit comparator 50 is true, it also is used to turn on the recorder 53 so that the data may be recorded at the time it is being read.

A short wave transmitter 54 having a suitable radiating antenna 55 is provided for short wave transmitting the coded data generated to a remote location. Transmitter 54 is activated by the true signal it receives from bit comparator 50 and thereafter transmits data presented to it, by means of the transmission gate 51, to a remote location. Such transmission is received by an antenna 56 and converted to electrical signals which are detected by receiver 57 and the signals received may thereafter be recorded by means of a recorder 58.

Where not indicated in the drawings, it is assumed that suitable power supplies are provided on the proper sides of all operating components, preferably from a single source of such power.

Receiving means 53 may also include a computer or micro-processor operable to process the code signals received or generated by sensing as described and utilizing such codes to control one or more local track switches or other devices such as servo motors 31S of FIG. 3 for operating switches or other devices Associated with the vehicle or freight car routing, loading or unloading.

In a modified from of the invention, the code generating microelectronic circuit which is sealed within container 10C may contain or be connected to terminals which include sliding brush-type contacts or pluggable connectors which terminate at the surface, beneath the surface or protrude beyond the surface of the wall of the container so that when the object which supports such container moves past or into alignment with brush contacts or pluggable connectors which terminate a source of current for energizing the code generating microelectronic circuit and a reading or code receiving circuit connected to transmitting, computing or recording means for the codes generated and coupling or connection is effected, the code or codes recorded or programmed in such micro-circuit may be generated with suitable energizing current from such current source and may be passed to the described computer, recorder or transmitter.

We claim:

1. A system for identifying objects comprising in combination:
   (a) a plurality of passive code generating microminiature electrical circuits each containing a shortwave transmitting means and each supported by its own substrate, antenna means connected to each of said code generating circuits, each of said microminiature electrical circuits having a programmed code therein and acting to generate and shortwave transmit, when energized, at least one code which is different from the codes generated by others of said plurality of code generating electrical circuits, means associated with each of said microminiature electrical circuits for receiving and converting radio-frequency energy when the circuit is in movement through a radio-frequency energy field to electrical energizing signal and means for applying said electrical energizing signals to electrically energize and power the code generating and shortwave transmitting means of each circuit, to shortwave transmit its programmed code,
   (b) means for securing each of said microminiature electrical circuits to respective of a plurality of different objects by attaching said circuits and their substrate to said objects,
   (c) a detection station including means for generating and applying an energy field in the form of radio-frequency energy of sufficient field strength to cause said means for receiving and converting to operatively energize each of said microminiature electrical circuits when each is in an operative location with respect to said energy field,
   (d) a shortwave receiving means at said detection station operable for receiving shortwave signals generated by the shortwave transmitting means of each of said micro-miniature electrical circuits when operatively disposed in and energized by said energy field and converting the short-wave signals received to electrical signals defining the codes sensed by said receiving means,
   (e) means operable during relative movement between said objects and said detection station to cause said electrical signals defining the codes transmitted to and received by the shortwave receiving means of the detection station to be generated as electrical signals on an output of said detection station, (f) a remote receiving station for receiving code signals generated by said detection station, (g) electronic computing means at said remote receiving station operable to process and analyze the code signals received by the receiving means of said remote receiving station, said electronic computing means being operable to generate control signals in accordance with the code signals received by the receiving means of said remote receiving station, (h) means connected to said electronic computing means for receiving and utilizing said control signals, (i) said means for utilizing said control signals includes a plurality of electrical switches and means controlled by the operation of said switches for controlling further relative movement between said objects and said detection station after each object is operatively located in said radio-frequency energy field of said detection station, and (j) means at said detection station for detecting when an object is present, said means for detecting being operative to energize said energy field generating means upon detection of an object to generate and apply shortwave energy to said receiving and converting means of said object to cause said code generating electrical circuit thereof to generate its code when the object containing said circuit is operatively located at said detection station.

2. A method for tracking and identifying objects comprising:

providing a plurality of electrical code generating circuits, each constructed and programmed to generate differing electrical codes, when electrically energized;

supporting each of said code generating circuits on a different object to be identified;

effecting relative movement between a plurality of said objects and a shortwave receiving means of a reading station when it is desired to automatically identify selected ones of said objects, said reading station containing a detector of codes programmed in said electrical circuits supported by the objects;

generating a shortwave energy field in the vicinity of said reading station as each object passes said reading station;

converting said shortwave energy field received at an object in the vicinity of said reading station to an electric energizing signal;

applying said electric energizing signal which is generated in the vicinity of the reading station to an electrical code generating circuit of objects in the vicinity thereof in a manner to effect the sequential generation of codes of each code generating circuit disposed in said energy field;

shortwave transmitting each of said codes generated when an object is in the vicinity of a reading station to a shortwave receiver at said reading station;

shortwave receiving and recording as coded electrical signals said shortwave transmitted codes;

thereafter reproducing and applying the recorded codes to indicate the locations of said objects in an object tracking operation;

reproducing codes received and recorded as coded electrical signals, applying said reproduced coded electrical signals to a computer, operating said computer to generate corresponding control signals and providing said control signals to control a device affecting further movement of said objects beyond said reading station;

conveying at least certain of said objects past a plurality of reading stations having field generating means, energizing the energy field generating means of each reading station when an object is in an operative location with a respective reading station so as to energize the code generating circuit of the object to effect generation and transmission of codes identifying each object to each reading station, retransmitting the codes received by each reading station from objects conveyed therepast to a remote receiver station operable to receive codes received by and retransmitted from each reading station, and recording codes received by said remote receiving station in a memory thereat for use in tracking objects conveyed past said plurality of reading stations; and detecting when each object is operatively located at each reading station, generating a control signal in response to detection, and employing said control signal to operate an energy field generating means at the reading station to generate said shortwave energy field thereat to effect generation of said electrical energy for energizing the code generating electrical circuit supported by the object.

3. A method for tracking and identifying objects comprising:

providing a plurality of electrical code generating circuits, each constructed and programmed to generate differing electrical codes, when electrically energized;

supporting each of said code generating circuits on a different object to be identified;

effecting relative movement between a plurality of said objects and a shortwave receiving means of a reading station when it is desired to automatically identify selected ones of said objects, said reading station containing a detector of codes programmed in said electrical circuits supported by the objects;

generating a shortwave energy field in the vicinity of said reading station as each object passes said reading station;

converting said shortwave energy field received at an object in the vicinity of said reading station to an electric energizing signal;

applying said electric energizing signal which is generated in the vicinity of the reading station to an electrical code generating circuit of objects in the vicinity thereof in a manner to effect the sequential generation of codes of each code generating circuit disposed in said energy field;

shortwave transmitting each of said codes generated when an object is in the vicinity of a reading station to a shortwave receiver at said reading station;

shortwave receiving and recording as coded electrical signals said shortwave transmitted codes;

thereafter reproducing and applying the recorded codes to indicate the locations of said objects in an object tracking operation; and detecting each object as it passes a reading station, generating a control signal in response to detection, and applying said control signal to control the operation of a shortwave energy field generator to cause it to generate said shortwave energy field at said reading station upon detecting an object thereat.

4. A method in accordance with claim 3 wherein said control signal is generated by a sensor which detects movement of an object as it is driven past a reading station.

* * * * *